Feb. 4, 1936.  L. L. LASSITER  2,029,664
METHOD OF BAKING A LOAF OF BREAD
Filed Nov. 24, 1934
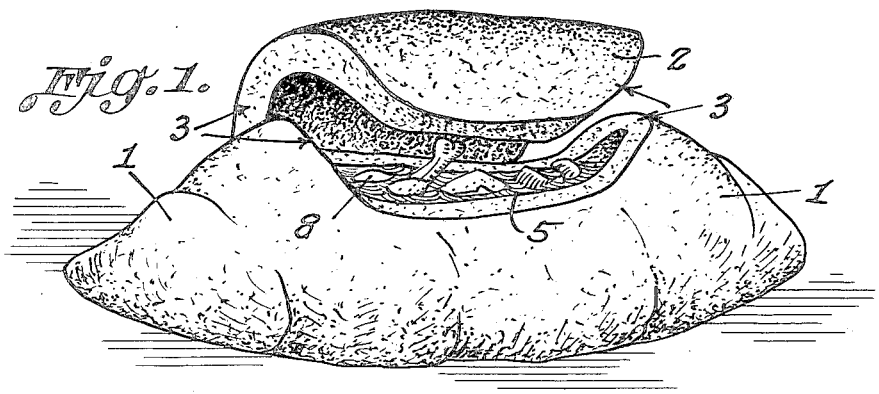
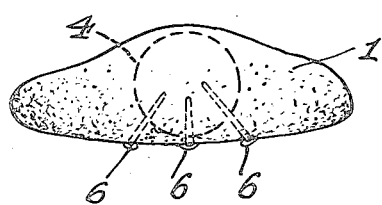 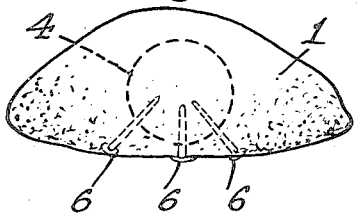
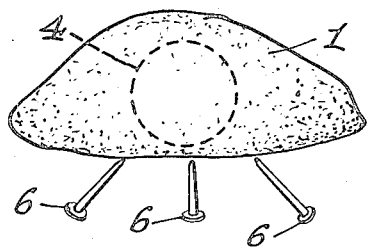 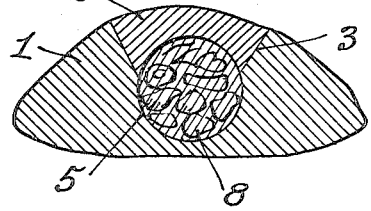
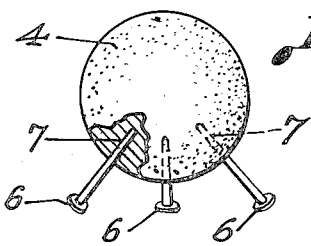
Inventor:
Lemuel L. Lassiter;
by Lester Sargent
Atty.

UNITED STATES PATENT OFFICE 2,029,664

METHOD OF BAKING A LOAF OF BREAD

Lemuel L. Lassiter, Greensboro, N. C.

Application November 24, 1934, Serial No. 754,651

3 Claims. (Cl. 107—54)

The object of my invention is to provide a novel method of baking a loaf of bread around a novel wooden or metal form so as to leave a hollow space in the loaf which can be filled with other food, such as chicken or ham; and to provide novel means for retaining the form in proper position in the loaf during the process of baking. I attain these and other objects of my invention by the means illustrated in the accompanying drawing, in which—

Figure 1 is a perspective view of the baked loaf with the filling placed inside, and with the portion of the loaf that is cut away to permit removal of the form in slightly raised position ready for replacement;

Fig. 2 is a view of the unleavened loaf with the form indicated by dotted lines;

Fig. 3 is a similar view of the baked loaf;

Fig. 4 is a similar view with the supporting pegs 6 withdrawn from the loaf;

Fig. 5 is a longitudinal section through the loaf after the form has been replaced with a meat filling;

Fig. 6 is a view partly in elevation and with a portion broken away and in section of the form 4.

Like numerals designate like parts in each of the several views.

The process of baking the loaf is to take the unleavened dough 1 and roll or wrap it around a form 4 of suitable size and of any desired shape such as the round form illustrated in Fig. 6 and Fig. 2. Pegs 6 are inserted through the dough into the apertures 7 in the form 4 to support the form in the desired position to keep it from sinking to the bottom of the dough. The loaf is then baked and in its baked form will appear as shown in Fig. 3. The supporting pegs 4 are then removed, as shown in Fig. 4, and a section 2 is cut either from the top or from the bottom of the loaf with a sharp knife and the form 4 is removed. Thus a hole is left in the center of the loaf which may be filled with any suitable edible filling 5, such as chicken, ham or other meat, etc. The portion 2 is then replaced after the hole in the center of the loaf has been filled with the filling 5. The loaves can be made in any size, and the forms of proportionate size.

It has been common practice to take a long roll, slit it open and put in a sausage, with the dressing, but this spreads the roll open so that it forces the dressing out, whereas in a loaf or roll made in accordance with my process of baking, the meat filling and dressing is entirely enclosed within the loaf or roll.

What I claim is:

1. The method of making a loaf of bread, consisting in wrapping the unleavened dough around a form of desired shape, baking the loaf with the form inside, cutting out a section of the baked loaf, removing the form to leave a hole for the insertion of an edible filling, inserting said filling, and replacing the cut out section of the loaf.

2. The method of making a loaf of bread, consisting in wrapping the unleavened dough around a form of desired shape, supporting the dough and form in a raised position, baking the loaf with the form inside, cutting out a section of the baked loaf, removing the form to leave a hole in the loaf, inserting an edible filling in said hole and replacing the cut out section of the loaf.

3. The method of making a loaf of bread, consisting in wrapping unleavened dough completely around a form and covering both its sides and ends with the dough, supporting the form in the central portion of the dough and baking the dough with the form thus supported making an incision in the top of the loaf, removing the form after the loaf has been baked, and inserting an edible filling in the space occupied by the form.

LEMUEL L. LASSITER.